(12) United States Patent
Yu et al.

(10) Patent No.: US 12,161,098 B2
(45) Date of Patent: Dec. 10, 2024

(54) PET WATER DISPENSER

(71) Applicant: GUANGDONG BOYU GROUP CO., LTD, Chaozhou (CN)

(72) Inventors: Youkai Yu, Chaozhou (CN); Bingyan Yu, Chaozhou (CN); Jianqin Yu, Chaozhou (CN)

(73) Assignee: GUANGDONG BOYU GROUP CO., LTD, Chaozhou (CN)

( * ) Notice: Subject to any disclaimer, the term of this patent is extended or adjusted under 35 U.S.C. 154(b) by 848 days.

(21) Appl. No.: 16/349,256

(22) PCT Filed: Apr. 26, 2019

(86) PCT No.: PCT/CN2019/084611
§ 371 (c)(1),
(2) Date: Jul. 13, 2020

(87) PCT Pub. No.: WO2019/228111
PCT Pub. Date: Dec. 5, 2019

(65) Prior Publication Data
US 2020/0337266 A1    Oct. 29, 2020

(30) Foreign Application Priority Data

May 31, 2018 (CN) .......................... 201820835018.7
Sep. 7, 2018 (CN) .......................... 201821472932.6

(51) Int. Cl.
*A01K 7/02*     (2006.01)
*F04B 23/02*    (2006.01)
*F04D 13/06*    (2006.01)

(52) U.S. Cl.
CPC ............ *A01K 7/025* (2013.01); *F04B 23/025* (2013.01); *F04D 13/06* (2013.01)

(58) Field of Classification Search
CPC .......... A01K 7/02; A01K 7/022; A01K 7/025; A01K 63/00; A01K 63/04; A01K 63/047
USPC ........................................... 119/72, 74
See application file for complete search history.

(56) References Cited

U.S. PATENT DOCUMENTS

| 7,270,082 B2 | 9/2007 | Plante |
| 8,171,885 B1 * | 5/2012 | Northrop .................. A01K 7/02 119/74 |
| 10,165,753 B1 * | 1/2019 | Huang ...................... A01K 7/02 |

(Continued)

FOREIGN PATENT DOCUMENTS

| CN | 203082248 | 7/2013 |
| CN | 203618522 U | 6/2014 |

(Continued)

OTHER PUBLICATIONS

European Patent Application No. 19809367.6 extended European search report and search opinion dated Jan. 13, 2021 (16 pages).

(Continued)

*Primary Examiner* — Peter M Poon
*Assistant Examiner* — Danielle A Clerkley
(74) *Attorney, Agent, or Firm* — Michael Best & Friedrich LLP

(57) ABSTRACT

Disclosed is a pet water dispenser, including: a drinking tray, disposed above a water storage tank; and a water pump, configured to pump drinking water in the water storage tank to the drinking tray.

9 Claims, 8 Drawing Sheets

(56) References Cited

U.S. PATENT DOCUMENTS

| | | | | |
|---|---|---|---|---|
| 2005/0232766 A1* | 10/2005 | Tsai | ................... | A01K 63/042 |
| | | | | 415/232 |
| 2013/0019809 A1 | 1/2013 | Mccallum et al. | | |
| 2015/0313180 A1 | 11/2015 | Lipscomb et al. | | |
| 2016/0165836 A1* | 6/2016 | Lipscomb | ................ | A01K 7/02 |
| | | | | 119/51.5 |

FOREIGN PATENT DOCUMENTS

| | | | |
|---|---|---|---|
| CN | 105221780 | | 1/2016 |
| CN | 106212310 A | | 12/2016 |
| CN | 206043076 | | 3/2017 |
| CN | 205830734 | | 12/2017 |
| CN | 206744307 | | 12/2017 |
| CN | 207011538 | | 2/2018 |
| CN | 107897027 A | | 4/2018 |
| CN | 208639295 | | 3/2019 |
| CN | 208768702 | | 4/2019 |
| DE | 202013004014 U1 * | 9/2014 | ........... A01K 63/042 |
| EP | 3315022 A1 | | 5/2018 |

OTHER PUBLICATIONS

Australian Patent Application No. 2019275527 Examination Report No. 1 dated Oct. 12, 2020.
PCT/CN2019/084611 International Search Report dated May 12, 2019 (6 pages).

\* cited by examiner

PET WATER DISPENSER

CROSS REFERENCE TO RELATED APPLICATIONS

The present application is a U.S. National Phase Application of International Application number PCT/CN2019/084611 filed on Apr. 26, 2019, which claims the priority of China patent application No. 201820835018.7, filed May 31, 2018, and the priority of China patent application No. 201821472932.6, filed Sep. 7, 2018, the entire disclosures of all of which are hereby incorporated herein by reference.

TECHNICAL FIELD

The present disclosure relates to the technical field of pet appliances, for example, to a pet water dispenser.

BACKGROUND

As people's living standards significantly improve, they are also paying increasing attention to various supplies for pets which are now regarded as family members.

A pet water dispenser in the related art typically pumps water in a water storage tank to a drinking tray or a water outlet head using a water pump, and a pet can get drinking water from the drinking tray or the water outlet head. Typically, the entire water pump is arranged in the water storage tank for purposes of pumping water, and in order to meet the normal operation requirements of the water pump, it is necessary to provide a power supply cable connected to the water pump in the water storage tank from an external power supply.

Because the entire water pump and the power supply cable are required to be soaked in water to work for a long term, the water pump and the power supply line are vulnerable to water leaks thus affecting the normal operation of the water pump. More importantly, there are potential electricity leakage risks. Furthermore, much inconvenience is involved when a user needs to move the pet water dispenser.

SUMMARY

This disclosure provides a pet water dispenser, whereby a stator of a water pump is no long soaked in water for long terms. Thus, electricity leakage is effectively avoided, which further enhances the safety.

The pet water dispenser includes a drinking tray disposed above a water storage tank, and a water pump configured to pump drinking water in the water storage tank to the drinking tray.

Figure 1:
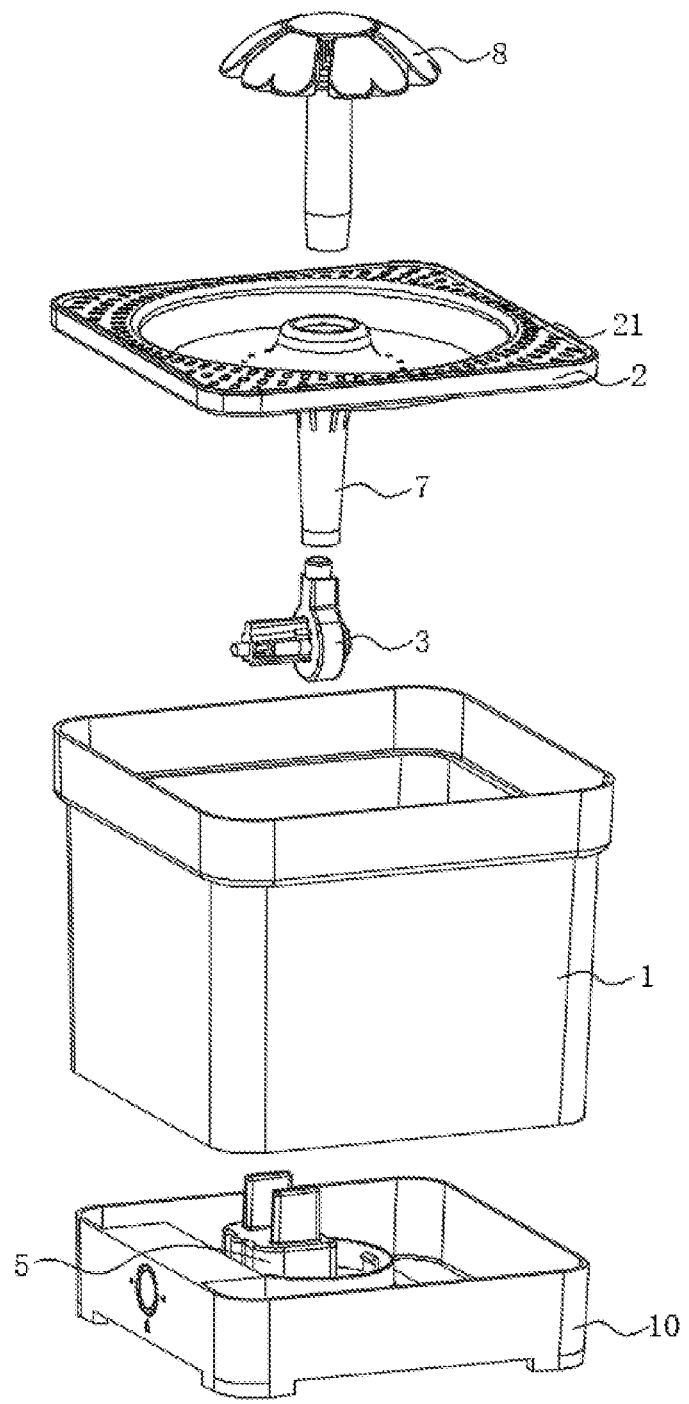
FIG. 1 is an exploded diagram of a pet water dispenser provided by Embodiment 1.

In Embodiment 1:
1. Water storage tank; 11. Baseplate;
2. Drinking tray; 21. Overflow through holes;
3. Water pump; 31. Stator assembly; 311. Stator coil; 312. Iron core; 32. Rotor assembly; 321. Rotating shaft; 322. Permanent magnet rotor; 33. Pump house; 331. Water inlet; 332. Water outlet; 34. Impeller;
4. Rotor mounting bracket;
5. Stator accommodating groove;
6. Power supply accommodating groove;
7. Drinking pipe assembly;
8: Water outlet head;
9: Filter assembly;
10. Base;

In Embodiment 2:
100. Base; 110. First water flow channel; 160. Positioning groove;
200. Joint; 210. Second water flow channel; 220. Second through hole; 230. Sealing assembly; 240. Connection block; 241. Positioning protrusion; 250. Limiting bump;
300. Pet water dispenser; 310. Drinking tray; 320. Water outlet head; 330. Water suction pipe; 340. Water outlet pipe.

DETAILED DESCRIPTION

In the description of the present disclosure, unless otherwise expressly specified and defined, terms "connected to each other", "connected" or "fixed" are to be construed in a broad sense, for example, as permanently connected, detachably connected, or integrated; mechanically connected or electrically connected; directly connected to each other or indirectly connected to each other via an intermediary; or internally connected or interactional between two components. For those skilled in the art, these terms in the present disclosure can be construed depending on specific context.

In the present disclosure, unless otherwise expressly specified and defined, when a first feature is described as "above" or "below" a second feature, the first feature and the second feature may be in direct contact, or may be in contact via another feature disposed between the two features. Furthermore, when the first feature is described as "on", "above" or "over" the second feature, the first feature may be right on, above or over the second feature or may be obliquely on, above or over the second feature, or the first feature may be simply situated at a higher level than the second feature. When the first feature is described as "under", "below" or "underneath" the second feature, the first feature may be right under, below or underneath the second feature or the first feature may be obliquely under, below or underneath the second feature, or the first feature may be simply situated at a lower level than the second feature.

Embodiment 1

The present embodiment provides a pet water dispenser, as illustrated in FIGS. 1 to 7, the water dispenser includes a water storage tank 1, a drinking tray 2, a water pump 3, a rotor mounting bracket 4, and a stator accommodating groove 5. The drinking tray 2 is detachably connected to the water storage tank 1 and is disposed above the water storage tank 1. The water pump 3 includes a stator assembly 31 and a rotor assembly 32. The rotor assembly 32 is disposed in the water storage tank 1, while the stator assembly 31 is disposed outside the water storage tank 1 at a position corresponding to the rotor assembly. The stator assembly 31 is operative to drive the rotor assembly 32 to rotate so as to pump drinking water in the water storage tank 1 to the drinking water disc 2. The stator accommodating groove 5 is disposed at a bottom of the water storage tank 1, and the stator assembly 31 is disposed inside the stator accommodating groove 5. The rotor mounting bracket 4 is configured for mounting and limiting the rotor assembly 32, and is disposed directly opposite to the stator accommodating groove 5. A rotor accommodating groove is opened on the stator accommodating groove 5 at a position corresponding to the rotor mounting bracket 4 and is configured for accommodating the rotor mounting bracket 4. The rotor mounting bracket 4 is disposed inside the rotor accommodating groove.

In this embodiment, the configuration in which the stator accommodating groove 5 is disposed at the bottom of the water storage tank is only one implementation. Alternatively, the stator accommodating groove 5 may be disposed on a side wall of the water storage tank 1, while the rotor mounting bracket 4 may be disposed corresponding to the stator accommodating groove 5.

Typically, by disposing the rotor mounting bracket 4 for placing the rotor assembly 32 in the water storage tank 1 and disposing the stator accommodating groove 5 for placing the stator assembly 31 at a bottom or a side wall of the water storage tank 1, the stator assembly 31 of water pump 3 is no longer soaked in water for a long term, effectually avoiding electricity leakage, and thus improving safety.

Figure 2:
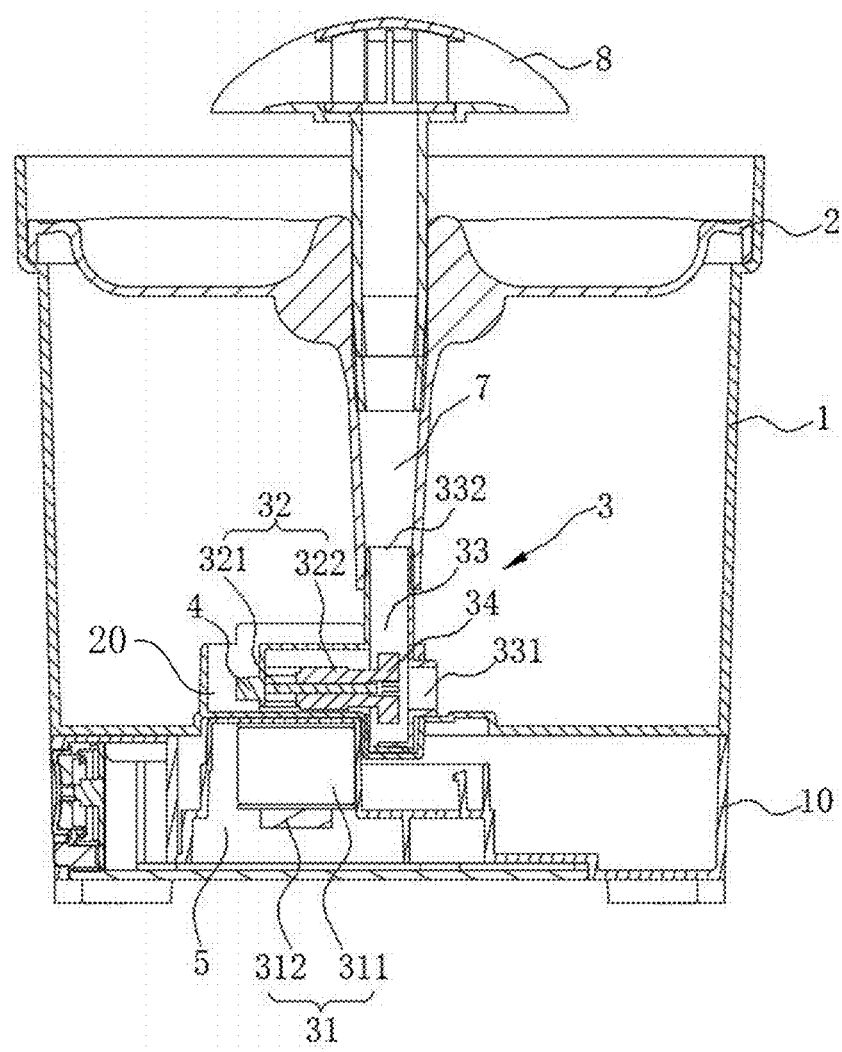
FIG. 2 is a sectional diagram of the pet water dispenser provided by Embodiment 1.

As illustrated in FIGS. 1 to 2, to ensure that the stator assembly 31 is effectively isolated from the water in the water storage tank 1, the water dispenser further includes a base 10 detachably connected to the water storage tank 1 and disposed below the water storage tank 1, and the stator accommodating groove 5 is disposed to protrude from the base 10 and is disposed on one side of the base 10 facing towards the water storage tank 1. At the same time, a rotor accommodating groove is opened on the stator accommodating groove 5 at a position opposite to the rotor mounting bracket 4 and is configured for accommodating the rotor mounting bracket 4, and the rotor mounting bracket 4 is disposed inside the rotor accommodating groove 20.

In addition, because the power supply assembly is also charged with electricity, in order to avoid a short circuit of the power supply assembly due to water leakage of the water storage tank 1 to affect the normal operation of the water pump 3, a power supply accommodating groove 6 for accommodating the power supply assembly is disposed on one side of the base 10 facing toward the water storage tank 1, so that the power supply assembly can be isolated from the water in the water storage tank 1, and the potential safety hazard of electric leakage is effectively eliminated. Furthermore, as the power supply assembly is integrally disposed in the power supply accommodating groove 6, and the base 10 is detachably connected to the water storage tank 1, when a user needs to move the pet water dispenser, inconvenience and potential safety hazards to the user caused by the exposed power cable can be prevented. In addition, the power supply assembly is disposed in the base 10, so that the power cable does not need to enter the water storage tank 1 from an opening at the upper part of the water storage tank 1, thereby improving the aesthetics of the whole pet water dispenser.

As illustrated in FIG. 1, FIG. 2, FIG. 4 and FIG. 5, to ensure the cleanliness of the pet drinking water, the water dispenser further includes a filter assembly 9 disposed inside the water storage tank 1, a drinking water pipe assembly 7 running through the drinking tray 2, and a water outlet head 8. A first end of the filter assembly 9 is communicated with the water storage tank 1, and a second end of the filter assembly 9 is communicated with a water inlet 331 of the water pump 3. In addition, a first end of the drinking water pipe assembly 7 is detachably connected and communicated with the water outlet 332 of the water pump 3. A second end of the drinking water pipe assembly 7 is detachably connected and communicated with the water outlet head 8, and the water outlet head 8 is disposed above the drinking tray 2. Because the drinking water pipe assembly 7 can be separately detachably connected to the water pump 3 and the water outlet head 8, the water pump 3, the drinking water pipe assembly 7 and the water outlet head 8 are convenient to be integrally taken out, thus reducing the difficulty of mounting and dismounting or the difficulty of maintenance, making it easy for cleaning and maintenance purposes.

After the drinking water in the water storage tank 1 is filtered by the filter assembly 9, the drinking water is pumped into the drinking water pipe assembly 7 by the water pump 3. Since the height of the water outlet head 8 is higher than that of the drinking tray 2, namely the water outlet head 8 is disposed above the drinking tray 2, the drinking water flowing through the drinking water pipe assembly 7 is sprayed from the water outlet head 8 and falls into the drinking tray 2. Because the drinking tray 2 is provided with a plurality of overflow through holes 21 along a circumference of the drinking tray 2, when the pet does not need a large amount of drinking water, the water in the drinking tray 2 can flow back into the water storage tank 1 through the overflow through holes 21 after the drinking tray 2 is full of water. The drinking water in the water storage tank 1 can be filtered and circulated, so that the cleanliness and quality requirements of the drinking water for pets can be ensured, and in the cases where no human intervention is present or a pet owner goes out, the drinking water can be automatically extracted by the water dispenser for the pets to drink.

In order to ensure uniform water distribution in the drinking tray 2, the drinking water pipe assembly 7 may be disposed at a center of the drinking tray 2. Meanwhile, a plurality of baffles (not shown in the figure) may be disposed on the water outlet head 8 at intervals along a circumference of the water outlet head 8, and the drinking water flowing through the drinking water pipe assembly 7 can be sprayed onto the drinking tray 2 from the spacing between two adjacent baffles, which not only improves the aesthetics and ornamental value, but also renders the drinking water sprayed onto the drinking tray 2 to be uniformly distributed.

Figure 3:
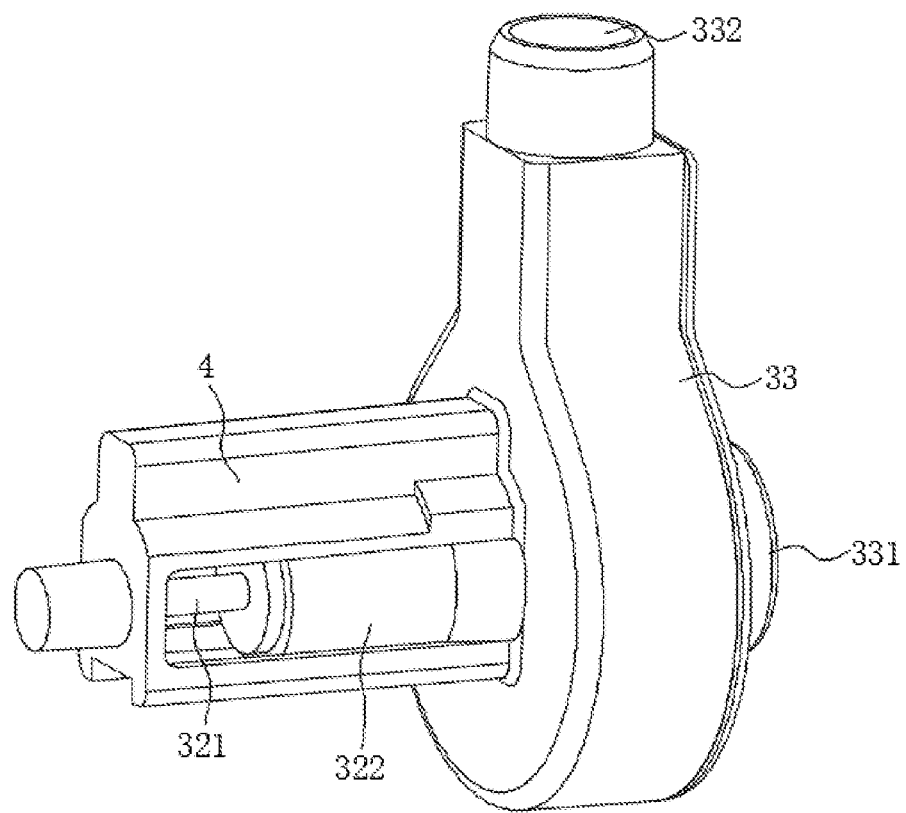
FIG. 3 is a schematic diagram of a water pump in the pet water dispenser according to Embodiment 1.
Figure 4:
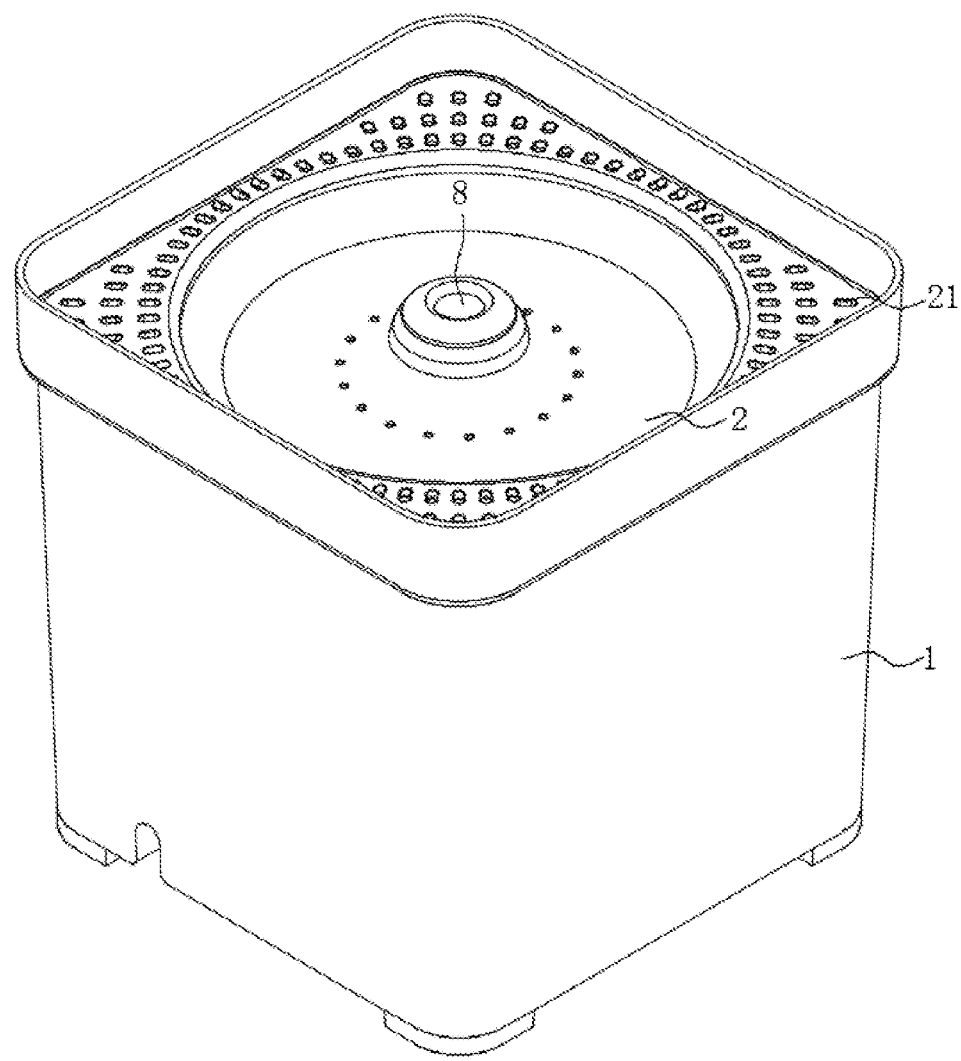
FIG. 4 is a schematic diagram of the pet water dispenser according to Embodiment 1 after being assembled.

As illustrated in FIGS. 2 to 3, the water pump 3 includes the stator assembly 31, the rotor assembly 32, an impeller 34 connected to the rotor assembly 32, and a pump house 33 sleeved outside the impeller 34. The water inlet 331 of the pump house 33 is communicated with the water storage tank 1 via the filter assembly 9, and the water outlet 332 is communicated with the drinking tray 2 via the drinking water pipe assembly 7. In addition, the pump house 33 is disposed in the water storage tank 1 and is detachably connected to the water storage tank 1, so that the rotor assembly 32 is convenient to be integrally mounted and dismounted, and the maintenance and the cleaning are convenient to be performed.

As illustrated in FIGS. 2 to 3, the stator assembly 31 includes a stator coil 311 and an iron core 312 running through the stator coil 311 and the rotor assembly 32 includes a rotating shaft 321 and a permanent magnet rotor 322. Because the rotating shaft 321, the permanent magnet rotor 322 and the impeller 34 are coaxially disposed, a magnetic field generated by the stator assembly 31 can drive the permanent magnet rotor 322 and drive the impeller 34 to rotate. Further as the water inlet 331 communicated with the water storage tank 1 is disposed on one side of the pump house 33 facing away from the rotor assembly 32, and the water outlet 332 communicated with the drinking water pipe assembly 7 is disposed on a side wall of the pump house 33, the stator assembly 31 can drive the rotor assembly 32 and drive the impeller 34 connected to the rotor assembly 32 to rotate. After being pumped from the water inlet 331 to the water outlet 332, the drinking water in the water storage tank 1 flows through the drinking water pipe assembly 7 and is sprayed onto the drinking tray 2 from the water outlet 8.

Figure 5:
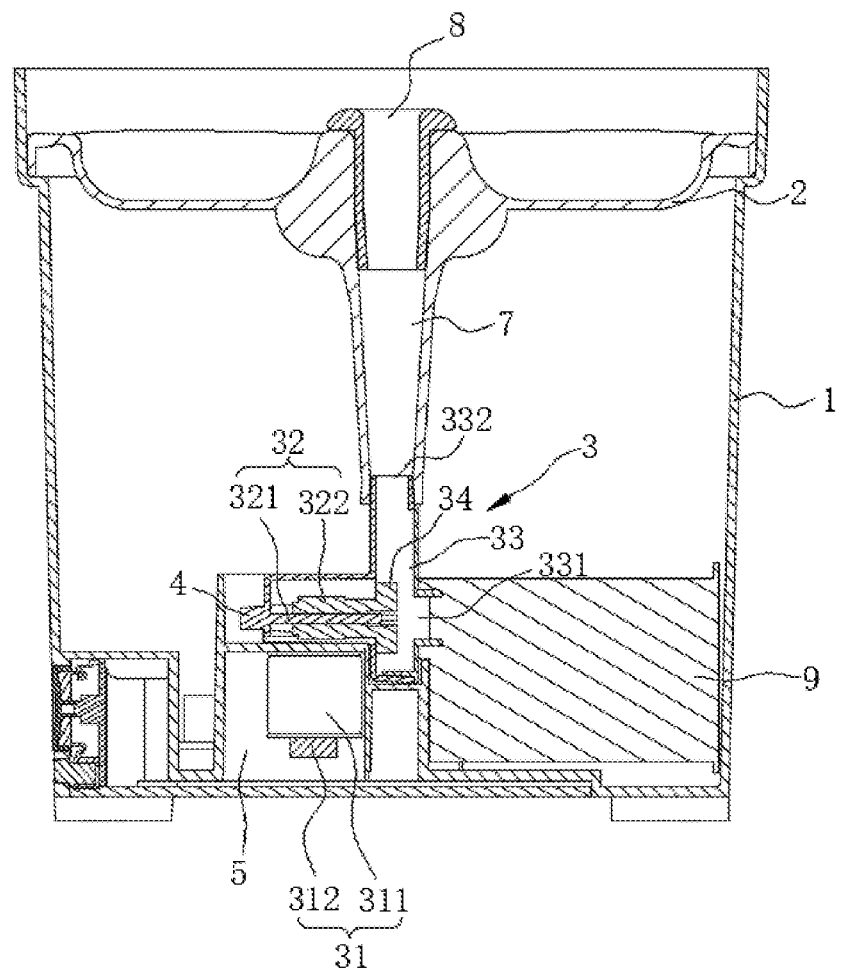
FIG. 5 is a sectional diagram of another pet water dispenser provided by Embodiment 1.
Figure 6:
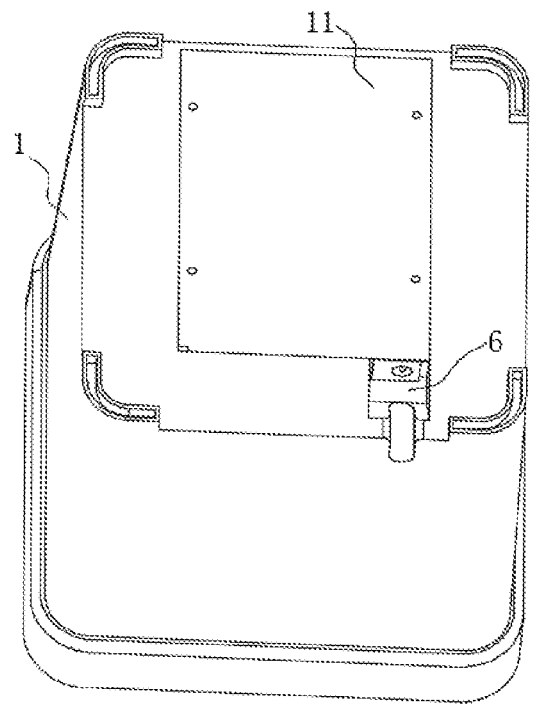
FIG. 6 is a schematic diagram of a water storage tank in the pet water dispenser provided by Embodiment 1.
Figure 7:
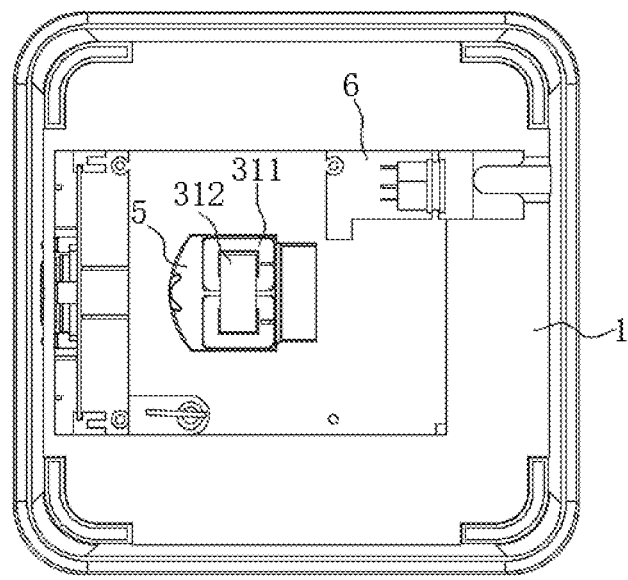
FIG. 7 is a schematic diagram of the water storage tank of FIG. 6 with a baseplate removed.
Figure 8:
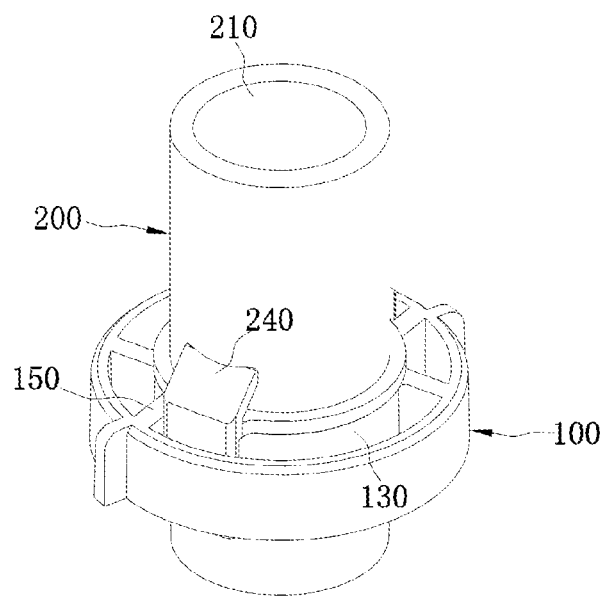
FIG. 8 is a schematic diagram of a flow regulating valve provided by Embodiment 2.

In addition to the above configuration, as illustrated in FIGS. 5 to 7, the stator accommodating groove 5 and the power supply accommodating groove 6 may be recessed toward the inside of the water storage tank 1 and located at the bottom of the water storage tank 1. The stator accommodating groove 5 and the power supply accommodating groove 6 can be of a split structure or of an integrated structure with the water storage tank 1, so that the fitting and assembly process can be reduced when the stator accommodating groove 5 and the power supply accommodating groove 6 are of the integrated structure with the water storage tank 1, so that the production and the installation are convenient, and the production cost is reduced.

The bottom wall of the water storage tank 1 is provided with a baseplate 11 detachably connected to the water storage tank 1 and a power supply accommodating groove 6 configured for accommodating components such as a power supply line, a power socket, a control circuit board and the like, where a space enclosed by the baseplate 11 and the water storage tank 1 is the stator accommodating groove 5. In an embodiment, the power socket, the stator assembly 31 and the circuit board are all disposed between the baseplate 11 and the bottom wall of the water storage tank 1.

In the present disclosure, the stator assembly 31 is configured to be encapsulated within the stator accommodating groove 5 by epoxy or another insulating material.

Adopting the epoxy or another insulating material to encapsulate the stator assembly 31 within the stator accommodating groove 5 has the following advantages. Firstly, the fixing effect on the stator assembly 31 can be achieved. Secondly, the stator assembly 31 can be isolated from the outside, so that a user can be prevented from being harmed in case electricity leakage of the stator assembly 31 occurs. Thirdly, the stator assembly 31 can be prevented from having a short circuit which would otherwise affect the normal operation of the water pump 3 when water leakage occurs with the water storage tank 1, thereby reducing potential safety hazards.

Embodiment 2

As illustrated in FIGS. 8 to 11, this embodiment provides a flow regulating valve including a base 100 and a joint 200 disposed on the base 100. The base 100 is provided with a first water flow channel 110 that runs through the inside of the base 100 and the joint 200 is provided with a second water flow channel 210 that runs through the inside of the joint 200. The first water flow channel 110 and the second water flow channel 210 are disposed directly opposite to each other, and one end of the base 100 adjacent to the joint 200 is provided with a first sealing plate, and one end of the joint 200 adjacent to the base 100 is provided with a second sealing plate. The first sealing plate is opened with a first through hole 120, the second sealing plate is provided with a second through hole 220 which is opened at a position opposite to the first through hole 120, and the joint 200 is rotatable relative to the base 100 to make the first through hole 120 and the second through hole 220 partially or completely overlap.

The base 100 of the flow regulating valve is provided with the first sealing plate, and the joint 200 is provided with the second sealing plate. A through hole is separately defined in each of the first sealing plate and the second sealing plate. When the first through hole 120 and the second through hole 220 partially overlap, water can flow through the overlapping part of the base 100 and the joint 200. The size of an overlapping area of the first through hole 120 and the second through hole 220 can be adjusted by rotating the joint 200, so that the flow amount of water flow is limited, and the flow rate of water is controlled.

Figure 9:
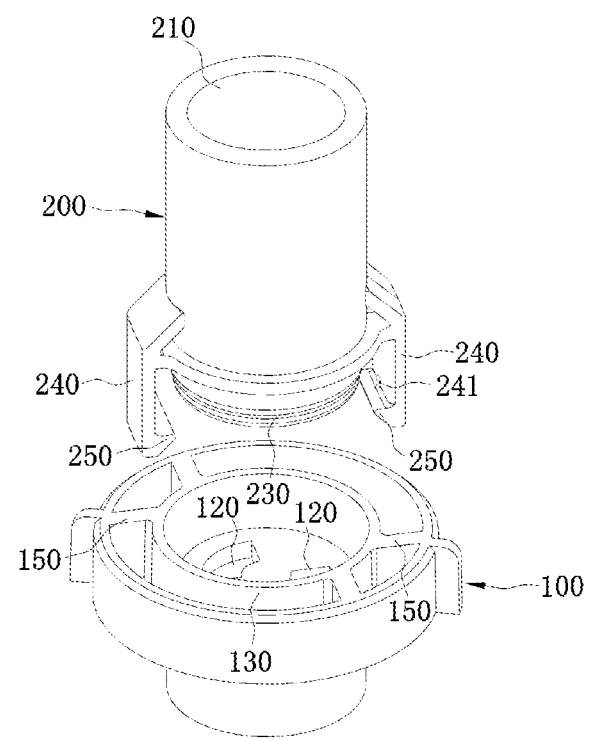
FIG. 9 is an exploded diagram of the flow regulating valve according to Embodiment 2.

Referring to FIG. 9, in the present embodiment, the first sealing plate is provided with an annular protrusion 130 that is disposed to protrude from the first sealing plate adjacent to the joint 200. An end of the joint 200 adjacent to the base 100 is located in the annular protrusion 130, and the first sealing plate abuts against the second sealing plate.

In an embodiment, a sealing assembly 230 is provided between the joint 200 and the annular protrusion 130.

By providing the annular protrusion 130 on the first sealing plate corresponding to the joint 200, connection area between the joint 200 and the base 100 can be increased, and connection stability between the joint 200 and the base 100 can be enhanced. In addition, the annular protrusion 130 can position the joint 200, so that the assembly of the flow regulating valve can be conveniently achieved.

In an embodiment, the sealing assembly 230 may be configured as a groove defined in an outer surface of the joint 200 with a sealing ring disposed in the groove, or a groove defined in a surface of the annular protrusion 130 contacting the joint 200, with a sealing ring disposed in the groove.

In addition to the above configuration, the sealing assembly 230 may be provided by providing an elastic rubber or the like on an outer surface of the joint 200 or an inner surface of the annular protrusion 130.

In an embodiment, a watertight assembly is disposed on a contact surface of the first sealing plate and the second sealing plate to prevent water flow from leaking from a gap in the contact surface of the first sealing plate and the second sealing plate.

In the present embodiment, the joint 200 is provided with a connection assembly connecting the base 100 to the joint 200.

Figure 10:
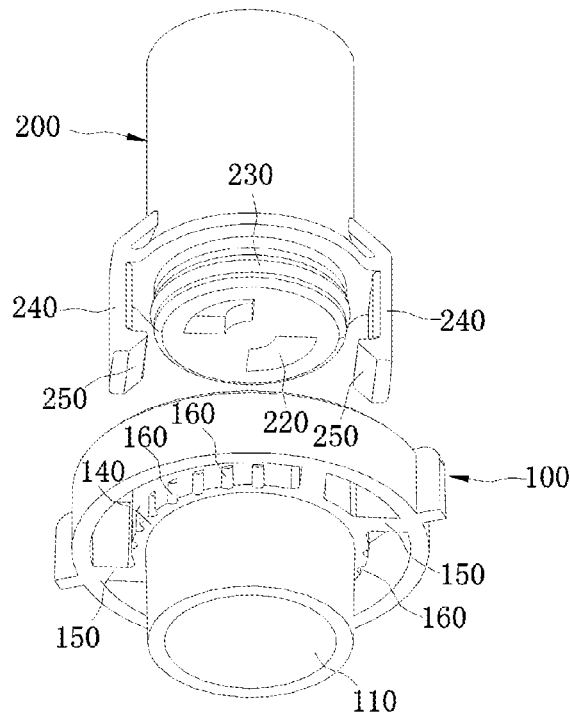
FIG. 10 is an exploded diagram of the flow regulating valve provided by Embodiment 2 seen from another perspective.
Figure 11:
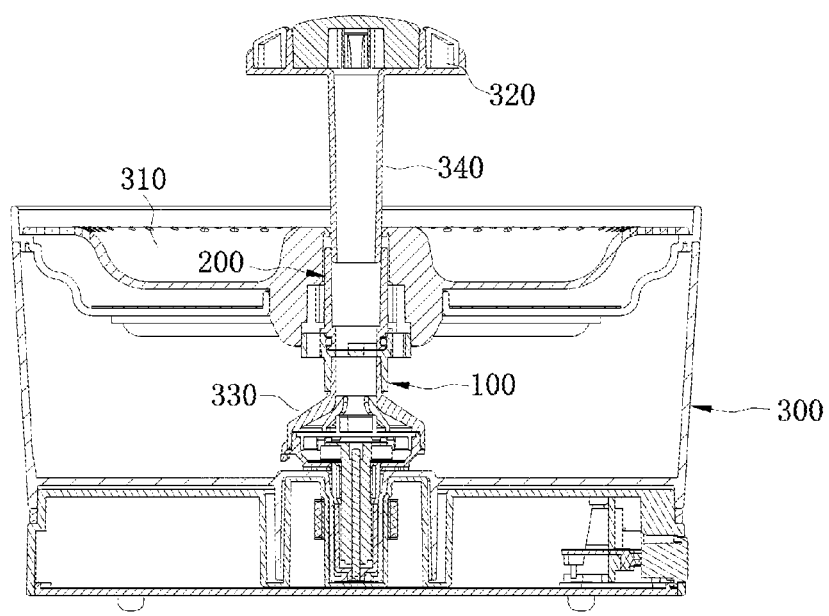
FIG. 11 is a sectional diagram of a pet water dispenser provided by Embodiment 2.

Referring to FIGS. 9 and 10, in an embodiment, the connection assembly includes at least two connection blocks 240 symmetrically disposed at sides of the joint 200, and the connection blocks 240 extend from the joint 200 toward the base 100.

In an embodiment, the base 100 is provided with limiting bosses 140 at a position corresponding to the connection blocks 240, an end of the connection blocks 240 adjacent to the base 100 is provided with limiting bumps 250 corresponding to the limiting bosses 140, and the limiting bosses 140 are clamped with the limiting bumps 250.

In an embodiment, the base 100 is circular in shape, and a side of the connection block 240 adjacent to the base 100 matches the shape of the base 100.

By providing the limiting bosses 140 on the base 100, providing the connection blocks 240 on the joint 200, and providing the limiting bumps 250 on the connection blocks 240 corresponding to the limiting bosses 140, the separation of the joint 200 can be limited when the joint 200 is connected to the base 100, the connection stability of the joint 200 and the base 100 can be further enhanced, the joint 200 is prevented from being separated from the base 100 when the water pressure is too high, and effective control of the flow is ensured.

In addition to the above-mentioned way of connection, the joint 200 and the base 100 may further be connected to the base 100 by fitting of the limiting groove and the limiting bumps 250.

In an embodiment, the base 100 is provided with an angle limiting assembly 150 configured to limit an angle of rotation of the joint 200.

In an embodiment, the base 100 is provided with the angle limiting assembly 150 at a position corresponding to the connection blocks 240.

In an embodiment, the angle limiting assembly 150 may be a limiting bump disposed on a side of the base 100 corresponding to the position of the connection blocks 240, and the angle of rotation of the joint 200 may be limited by adjusting the setting position of the limiting bump.

In an embodiment, a positioning assembly may be provided between the base 100 and the joint 200 to provide the user with a sense of rotation when the user rotates the joint 200.

In an embodiment, a positioning protrusion 241 may be disposed on a side of the connection block 240 adjacent to the base 100 to protrude from the side, and a plurality of positioning grooves 160 may be recessed in a surface of the base 100 corresponding to a position of the positioning protrusion 241. By the cooperation of the positioning protrusion 241 and the positioning groove 160, the angle assisted positioning effect during the rotation of the joint 200 can be achieved.

In an embodiment, the positioning groove 160 may be further disposed on a side of the connection block 240 adjacent to the base 100, and the positioning protrusion 241 may be disposed on a surface of the base 100.

In an embodiment, a positioning protrusion 241 is semi-circular in shape, and an edge position of the positioning groove 160 is rounded.

In addition, the present embodiment further provides a pet water dispenser 300, including a water storage tank, a drinking tray 310, a water pump, and the flow regulating valve described above.

In an embodiment, the pet water dispenser 300 includes a water storage tank, a water pump, a drinking tray 310, a water outlet head 320, a water suction pipe 330, and a water outlet pipe 340, where the flow regulating valve is disposed between the water suction pipe 330 and the water outlet pipe 340 on the water flow channel.

What is claimed is:
1. A pet water dispenser, comprising:
a water storage tank;
a drinking tray, disposed on the water storage tank; and
a water pump, configured to pump drinking water in the water storage tank to the drinking tray;
wherein the drinking tray is detachably connected to the water storage tank and is located above the water storage tank; the water pump comprises a stator assembly and a rotor assembly, wherein the rotor assembly is disposed inside the water storage tank, and the stator assembly is oppositely disposed to the rotor assembly and is disposed outside the water storage tank; the pet water dispenser further comprises a stator accommodating groove disposed on a side wall or a bottom of the water storage tank, the stator assembly is disposed in the stator accommodating groove, and an axis of the rotor assembly is configured to be horizontal;
wherein the water pump further comprises a rotor mounting bracket configured for mounting and limiting the rotor assembly, wherein a rotor accommodating groove is formed on the stator accommodating groove at a position opposite to the rotor mounting bracket and is configured for accommodating the rotor mounting bracket, and the rotor mounting bracket is disposed inside the rotor accommodating groove and is disposed around the rotor assembly.

2. The pet water dispenser according to claim 1, wherein the stator accommodating groove is recessed towards the inside of the water storage tank and is disposed at the bottom of the water storage tank.

3. The pet water dispenser according to claim 1, further comprising a base detachably connected to the water storage tank and located below the water storage tank, and the stator accommodating groove is disposed to protrude from the base and is located on one side of the base facing towards the water storage tank.

4. The pet water dispenser according to claim 1, wherein the water pump further comprises an impeller connected to the rotor assembly and a pump house sleeved outside the impeller, and a first end of the pump house is communicated with the water storage tank and a second end of the pump house is communicated with the drinking tray, wherein the impeller is connected to the rotor assembly, and the stator assembly is configured to drive the rotor assembly and drive the impeller to rotate, so as to pump the drinking water in the water storage tank to the drinking tray, wherein one side of the pump house facing away from the rotor assembly is provided with a water inlet communicated with the water storage tank, and a side wall of the pump house is provided with a water outlet communicated with the drinking tray.

5. The pet water dispenser according to claim 1, further comprising a water outlet head and a drinking pipe assembly penetrating through the drinking tray, wherein a first end of the drinking pipe assembly is detachably connected and communicated with the water pump and a second end of the drinking pipe assembly is detachably connected and communicated with the water outlet head, the water outlet head being disposed above the drinking tray.

6. The pet water dispenser according to claim 1, further comprising a filter assembly disposed in the water storage tank, wherein a first end of the filter assembly is communicated with the water storage tank, and a second end of the filter assembly is communicated with the water pump.

7. The pet water dispenser according to claim 1, wherein the drinking tray is provided with a plurality of overflow through holes along a circumference of the drinking tray.

8. The pet water dispenser according to claim 1, wherein the stator assembly is configured to be encapsulated within the stator accommodating groove by epoxy or another insulating material.

9. The pet water dispenser according to claim 1, wherein the bottom of the water storage tank is provided with a power supply accommodating groove configured for accommodating a power supply assembly.

* * * * *